United States Patent [19]

Hart

[11] Patent Number: 5,676,436

[45] Date of Patent: Oct. 14, 1997

[54] POSITIVE DRIVE ENDLESS RUBBER BELTED TRACK

[75] Inventor: Cullen P. Hart, Peoria, Ill.

[73] Assignee: Caterpillar Inc., Peoria, Ill.

[21] Appl. No.: 414,868

[22] Filed: Mar. 31, 1995

[51] Int. Cl.⁶ ............................................. B62D 55/18
[52] U.S. Cl. ........................... 305/157; 305/165; 305/178; 305/189
[58] Field of Search ........................ 305/159, 160, 305/161, 162, 178, 179, 185, 187, 189, 191, 192, 193, 194, 195, 196, 197, 198, 35 R, 35 EB, 39, 165, 166, 167, 168, 169, 170, 171, 157, 158

[56] References Cited

U.S. PATENT DOCUMENTS

| 2,022,567 | 11/1935 | Kegresse | 305/158 |
| 2,461,150 | 2/1949 | Flynn et al. | 305/180 |
| 2,998,998 | 9/1961 | Hyler et al. | 305/157 X |
| 3,378,314 | 4/1968 | Knowles | 305/157 X |
| 3,416,845 | 12/1968 | Scanland | 305/179 |
| 3,602,364 | 8/1971 | Maglio et al. | 198/193 |
| 3,747,995 | 7/1973 | Russ, Sr. | 305/179 |
| 3,876,022 | 4/1975 | Ikarimoto | 180/9.22 |
| 4,596,298 | 6/1986 | Heki et al. | 180/9.46 |
| 4,953,920 | 9/1990 | Jager | 305/165 X |

FOREIGN PATENT DOCUMENTS

| 5286464 | 11/1993 | Japan | 305/35 EB |

*Primary Examiner*—Russell D. Stormer
*Attorney, Agent, or Firm*—Pankaj M. Khosla; Frank L. Hart

[57] ABSTRACT

A positive drive endless rubber belted track is adapted to be attached to track links of an endless track link assembly. The particular construction of the core and grousers of the belted track permit the rubber belted track to stretch as it passes over the driving mechanism and idler of the machine.

8 Claims, 1 Drawing Sheet

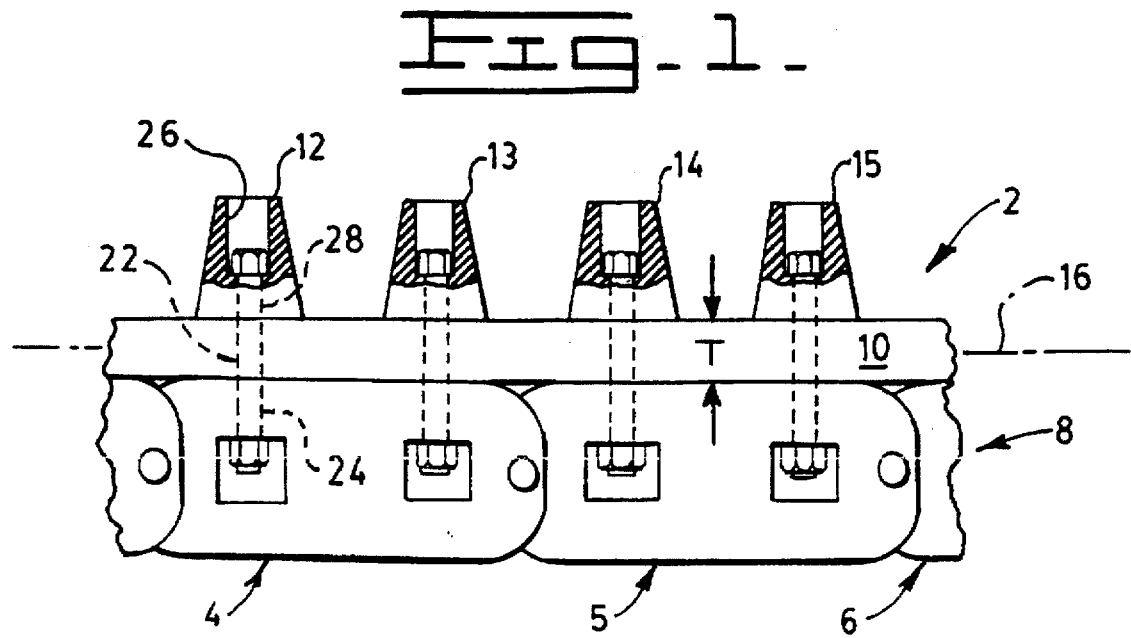
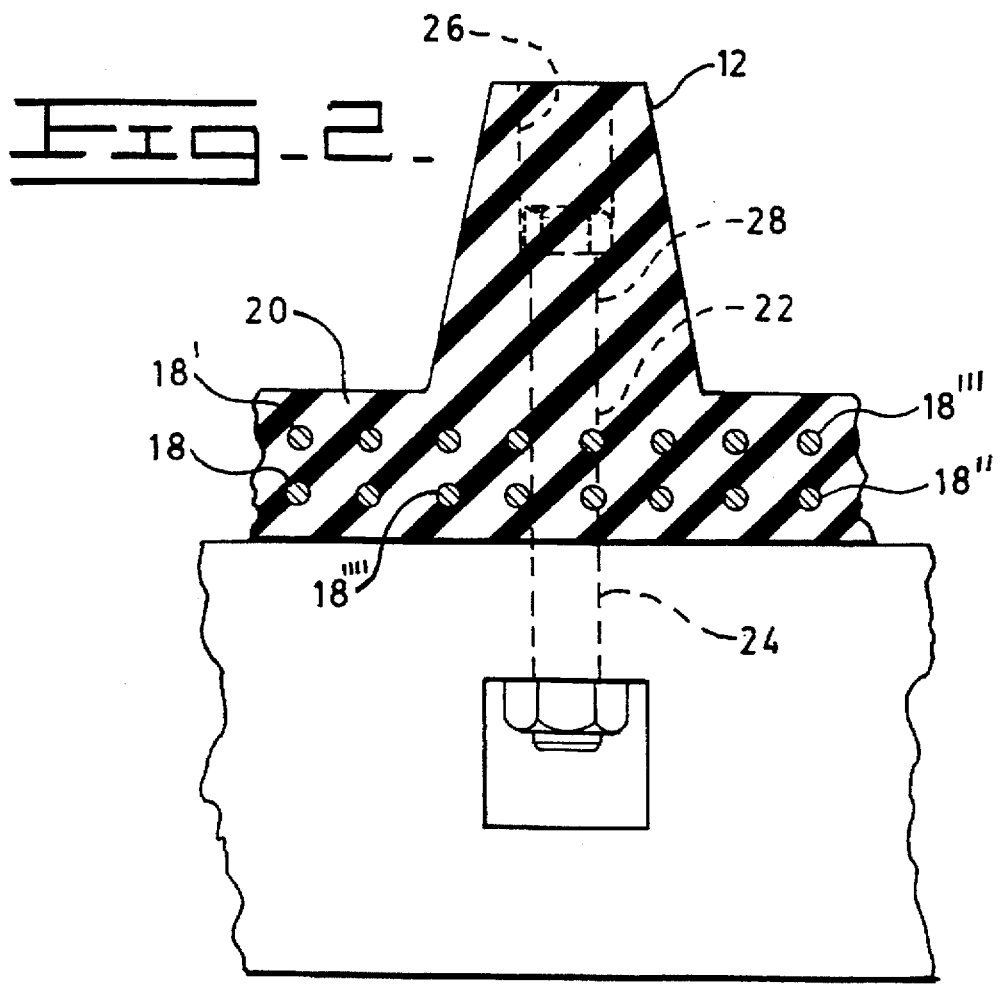

POSITIVE DRIVE ENDLESS RUBBER BELTED TRACK

TECHNICAL FIELD

The present invention relates to a positive drive endless rubber belted track adapted to be attached to track links of an endless track link assembly of a crawler work machine.

BACKGROUND ART

It is desirable to provide crawler work machines with track that can be operate on road surfaces without damaging the roads. Heretofore, various track and track portions have been developed which provide rubber in contact with the road surface. None of them have the construction of the present invention which provides positive drive endless rubber belted track of a construction for attachment to a conventional track link assembly as a unitary belted rubber track. This was accomplished in this invention by constructing a core having reinforcing elements which permit stretch of the belt as it pass about the driving mechanism and the idler wheel. This construction represents a saving of time and labor in installing and removing the track belt while providing positive drive for endless rubber belted track.

DISCLOSURE OF THE INVENTION

A positive drive endless rubber belted track is adapted to be attached to track links of an endless track link assembly. The endless rubber belted track has an endless rubber core having a thickness "T" a longitudinal axis, a plurality of reinforcing elements each extending transverse the longitudinal axis and being encapsulated in rubber. A plurality of bolt opens extend through the core thickness "T" and are positioned at preselected locations each alignable with a respective grouser bolt opening of a respective track link. The core is free of longitudinally extending reinforcing elements. A plurality of grousers each have at least one bolt opening pocket and associated bolt opening alignable with a respective core opening and link opening.

BRIEF DESCRIPTION OF THE DRAWINGS

FIG. 1 is a diagrammatic view of a portion of an endless track having the apparatus of this invention; and FIG. 2 is a diagrammatic sectioned view of a portion of the positive drive endless rubber belted track of this invention.

BEST MODE FOR CARRYING OUT THE INVENTION

Referring to FIGS. 1 and 2, a positive drive endless rubber belted track 2 is shown connected to track links 4,5,6 of an endless track link assembly 8. It should be understood that track links 4,5,6 and track link assemblies 8 are well known in the art and for purposes of brevity will not be described in detail.

The positive drive endless rubber belted track 2 of this invention has an endless rubber core and a plurality of grousers 12,13,14,15.

The belted track core 10 has a thickness "T" a longitudinal axis 16, a plurality of reinforcing elements 18,18',18''',18'''' etc. each extending transverse the longitudinal axis 16 and are encapsulated in rubber 20. The core 10 of this invention is free of reinforcing elements that extend longitudinally along the longitudinal axis 16 or parallel to the axis 16. By so eliminating any longitudinally extending reinforcing elements, the belted track core 10 is free to stretch as it passes about the driving mechanism and idler of the machine.

A plurality of bolt openings 22 extend through the core thickness "T" and are positioned at preselected locations each alignable with a respective grouser bolt opening 24 of a respective track link 4.

A plurality of grousers 12,14 each have at least one bolt opening pocket 26 and associated bolt opening 28 alignable with a respective core opening 22 and link opening 24.

In a preferred embodiment, the grousers 12, 14 are molded to the core 10 forming a unitary endless rubber belted track 2, each grouser 12, 14 has at least two grouser bolt pocket openings 26, 26' and grouser bolt openings 28,28'. The rubber encapsulating the reinforcing elements 18,18',18'' etc. is preferably in the range of about 45 to about 75 Shore A durometer hardness, more preferably about 55 durometer hardness.

Industrial Applicability

By so constructing the belted track of this invention, the belt is fixedly connected to each track link and thereby provides a rubber track belt which has positive drive. The specific construction of the reinforcing elements of the core permit the belt to stretch while passing over the idler and the driving mechanism of the machine, such as a crawler tractor, for example. By this construction the rubber belted track is of unitary construction which improves maintenance problems while maintaining the desirable positive drive characteristics.

We claim:

1. A longitudinally stretchable positive drive endless rubber belted track adapted to be attached to track links of an endless track link assembly, consisting essentially of:

an endless unitary rubber core having a thickness "T", a longitudinal axis, a plurality of reinforcing elements each extending transverse said longitudinal axis and being encapsulated in rubber, and a plurality of bolt openings extending through said core thickness "T" and being positioned at preselected locations each alignable with a respective grouser bolt opening of a respective track link;

a plurality of grousers each having at least one bolt opening pocket and an associated bolt opening alignable with a respective core opening and a link opening; and said core being free of longitudinally extending reinforcing elements and said track being stretchable along said longitudinal axis.

2. A longitudinally stretchable rubber belted track, as set forth in claim 1, wherein said grousers are molded to said core, forming a unitary endless rubber belted track.

3. A longitudinally stretchable rubber belted track, as set forth in claim 1, wherein each grouser has at least two bolt pocket openings, each grouser being alignable with a respective core opening and a link opening.

4. A longitudinally stretchable rubber belted track, as set forth in claim 1, wherein said core is formed of rubber having a Shore A durometer in a range of about 45 to about 75.

5. A longitudinally stretchable rubber belted track, as set forth in claim 4, wherein said core is formed of rubber having a Shore A durometer of about 55.

6. A longitudinally stretchable positive drive endless rubber belted track attachable to track links of an endless track link assembly, consisting essentially of:

an endless unitary rubber core having a thickness "T", a longitudinal axis, a plurality of reinforcing elements each extending transverse said longitudinal axis and being encapsulated in rubber, and a plurality of bolt openings extending through said core thickness "T" and being positioned at preselected locations each alignable with a respective grouser bolt opening of a respective track link;

a plurality of grousers molded to said core and forming a unitary endless rubber belted track, each grouser having at least one bolt opening pocket and an associated bolt opening alignable with a respective core opening and a link opening; and said core being free of longitudinally extending reinforcing elements and said track being stretchable along said longitudinal axis.

7. A longitudinally stretchable rubber belted track, as set forth in claim 6, wherein each grouser has at least two bolt pocket openings, each grouser being alignable with a respective core opening and a link opening.

8. A longitudinally stretchable rubber belted track, as set forth in claim 6, wherein said core is formed of rubber having a Shore A durometer in a range of about 45 to about 75.

* * * * *